Figure 1:
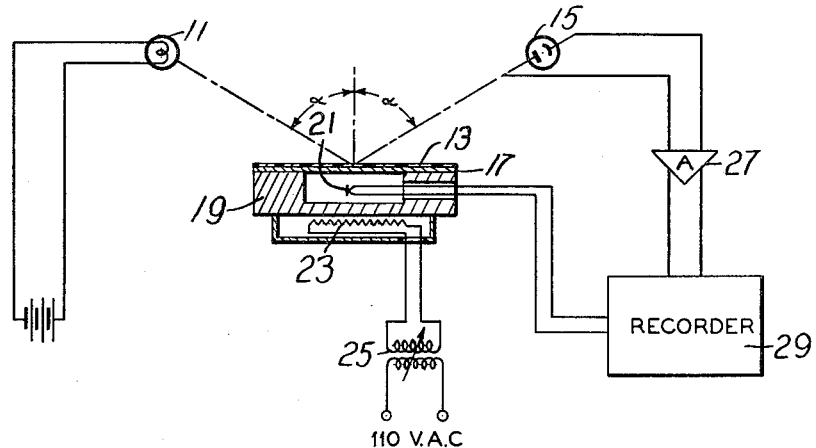

May 5, 1964 K. L. HOY 3,131,557
SPECULAR SURFACE ANALYSIS
Filed Oct. 3, 1960 2 Sheets-Sheet 1

INVENTOR.
KENNETH L. HOY
BY Howard K. Kotha
ATTORNEY

United States Patent Office 3,131,557
Patented May 5, 1964

3,131,557
SPECULAR SURFACE ANALYSIS
Kenneth L. Hoy, St. Albans, W. Va., assignor to Union
Carbide Corporation, a corporation of New York
Filed Oct. 3, 1960, Ser. No. 60,088
8 Claims. (Cl. 73—17)

The present invention relates to a method for determining the specular characteristics of substantially flat surfaces and more particularly to a method designed to measure the change in light reflectance capabilities or surface gloss of dispersion coating materials as the materials are heated at controlled selectable rates and transformed from liquid state to solid state.

Need for a method and apparatus to determine the film forming characteristics of dispersion coating materials such as plastisols, organosols, latices and the like has long been recognized by industry. Scientific information obtainable from such method and apparatus can contribute much to the development and formulation of new products as well as form the basis for standardized control procedures in producing known materials. Presently available test procedures and apparatus for determining these properties require critical control and frequently yield spurious results.

A plastisol is a pourable dispersion of a finely divided polymer such as polyvinyl chloride in a non-volatile liquid plasticizer. When a plastisol is gradually heated the polymer imbibes the liquid plasticizer and becomes immobile or gelled. During the gelation process the wet, glossy plastisol surface becomes dull. This change in surface gloss is explained by the fact that the resin has swollen to the point where the particles are exposed on the surface. At this point in the gelation process, the surface is quite rough on a microscopic scale and hence scatters incident light, giving the surface a dull appearance. Continued application of heat to the material causes the resin particles to fuse together and become quite clear and the entire composition to become tough and flexible. It has been discovered that the change in the surface reflectance capability of a particular material as heat induced gelation and fusion take place possesses specular qualities which uniquely represent and identify the particular film coating material under investigation.

To meet industry's need for a method and apparatus accurately and rapidly to ascertain the specular characteristics of such materials, the present invention was developed.

Briefly, the apparatus used to perform the method of the present invention comprises a measuring device to determine continuously during testing the specular characteristics of an applied film or surface coating as said film or coating is heated at a preselected rate. The apparatus measures and records both the sample film temperature and the intensity of a beam of light reflected from the surface of said film as film temperature is increased at a controlled rate. The invention also comprises novel details of construction and novel combinations of components together with other features and results which will be more apparent from the ensuing description. The drawings merely show and the description merely describes a preferred embodiment of apparatus with which to practice the present invention which is given by way of illustration.

Figure 2:
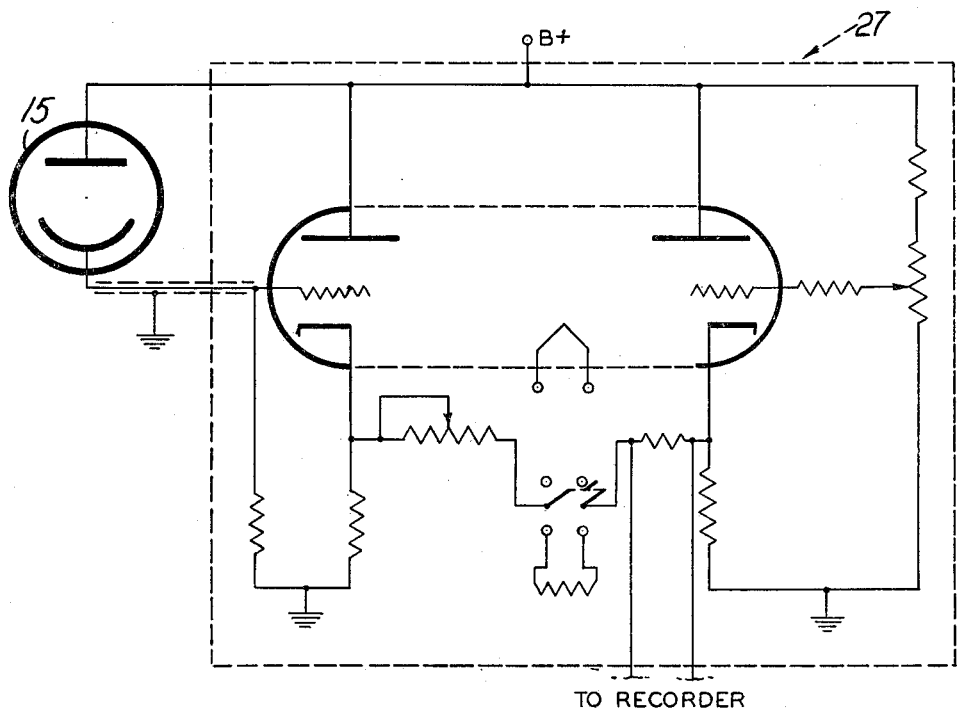
Figure 3:
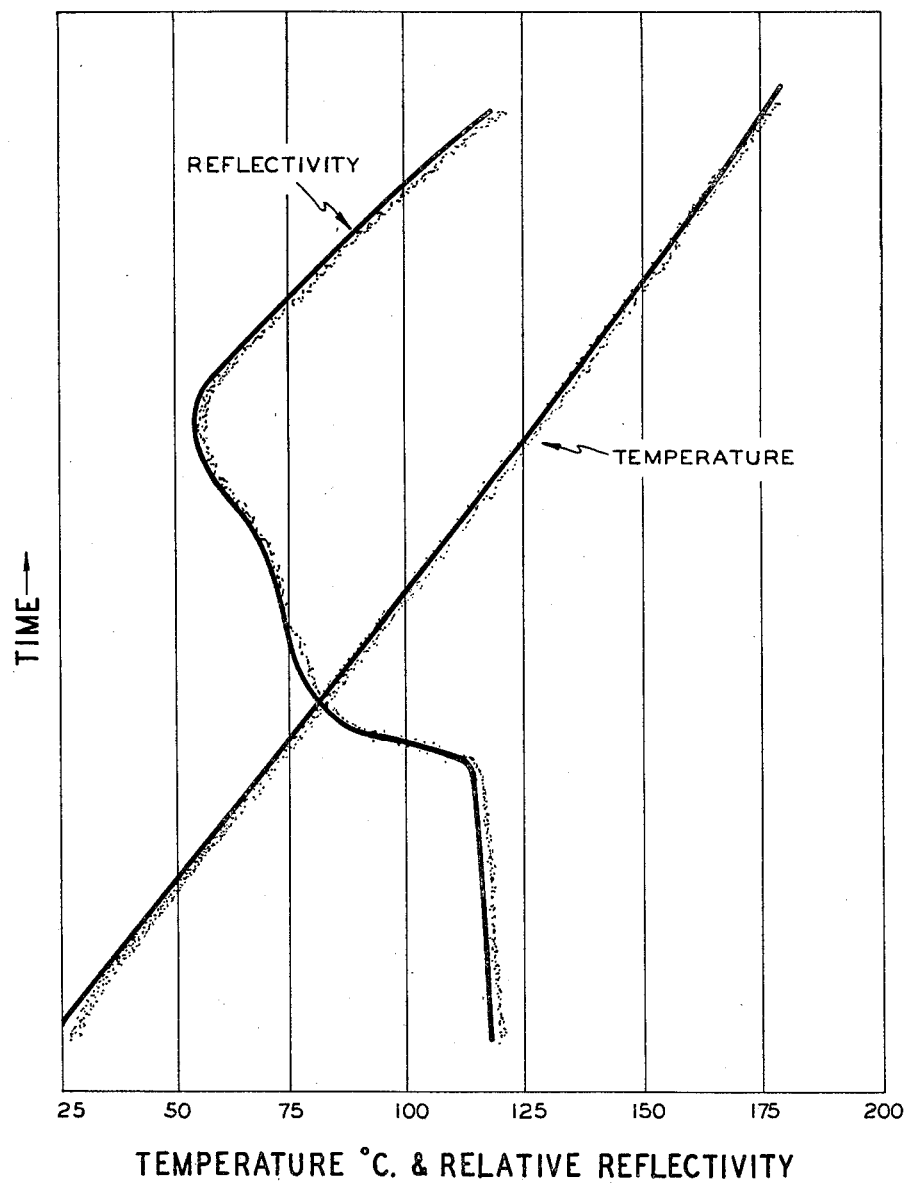

In the drawings:
FIG. 1 is a schematic-diagrammatic arrangement of the apparatus of the present invention for determining the specular characteristics of materials to be tested;
FIG. 2 is a schematic diagram of an electronic signal amplifier comprising a portion of the apparatus of the present invention and
FIG. 3 is a reproduction of recorded test data on a vinyl resin plastisol showing the material's reflectance characteristics with respect to temperature as a function of time.

In the preferred embodiment of my invention and with particular reference to FIG. 1 of the drawings, a stable light source 11 is placed at an angle from a line normal to the surface of sample film 13, said angle being less than 90°, but more than 15°, and preferably 60°. Photo tube 15 is placed at an angle equal to but opposite that of the angle of the incident light beam from light source 11. Film 13 is applied to metal test panel 17 which is held in place on heating block 19 by means of a vacuum hold-down system not shown in the drawings. Heating block 19 is provided with a thermocouple 21 disposed just beneath the surface of metal panel 17. Electric heater 23 is mounted on the underside of block 19 and is controlled by a suitable variable energy source such as variable transformer 25. Photo tube 15 provides an input signal proportional to the amount of light from light source 11 reflected to said photo tube by film 13 for application to a signal amplifier indicated generally by designation 27. The output of signal amplifier 27 and the output of thermocouple 21 are concurrently applied to test data recorder 29. In this manner, signals representing both temperature and reflected light are recorded concurrently against time.

In the preferred embodiment of my invention the light source used is a laboratory type microscope illuminator with a lamp operating on a 6.5 volt steady D.C. supply. Light control is effected by an iris diagram and shutter on the illuminator assembly. The photo tube used is an RCA type 1P-39, mounted in a blackened housing. FIG. 2 of the drawings indicates schematically the circuitry of the photo tube and its associated amplifier component. The sample mounting block and heater assembly comprises an aluminum block with a 300 watt electric heater affixed to the under side. The block and heater assembly rests upon a moveable stand adapted to be raised or lowered to focus the reflected light from light source 11 on photo tube 15. The recorder used is a Minneapolis-Honeywell recording potentiometer Model No. 153X64P4–X–41J.

In a particular series of tests the method of the present invention was used in the investigation of the physical characteristics of a vinyl resin plastisol. FIG. 3 of the drawings is a reproduction of test data recorded during this investigation and is illustrative of the test data obtainable through the use of my invention. Points on the data curves of the graph of FIG. 3 comprise unique indicia of specific properties of the material investigated. Temperature at which gelation commences, the speed with which gelation progresses, the fusion point of resin particles and the point of complete curing of the compound are but a few of the data items produced by the method of this invention.

Repeated tests have shown my method to possess extremely high sensitivity and reproducibility. The specular analyzer and method of the present invention comprise a new, simple and effective tool for determining the gelation and fusion properties of plastisols, organosols and latice systems. The present invention can be used to determine blend to blend variations in production resins in a simple rapid manner as well as indicate the effect of formulation variables on ultimate resin properties. My invention can be used to characterize a variety of plasticizers, plastisol resins, organosols and latices and may be applied to the development of new film and coating compounds, to the theoretical study of the formulation of such compounds and to the study of resin-plasticizer interactions. By maintaining constant sample temperature, it is possible to analyze surface qualities of various coating materials as constant temperature drying takes place. Other uses and adaptions of the present invention and the method associated with its use will readily suggest themselves to those skilled in the art.

What is claimed is:

1. A method for determining physical characteristics of a coating material during transformation of said material from a liquid state to a solid state comprising applying a film of said material in liquid state to a substantially flat surface, directing a light beam to said film of said material at an angle from a line normal to said film, said angle being less than 90° but more than 15°, arranging and disposing a photonic signal generator means in the path of said light beam at a point specularly opposite the source of said light beam to sense light reflected from said film and to develop a first signal proportional to the intensity of light sensed, concurrently heating said film at a controlled heating rate, sensing the amount of applied heat and developing a second signal proportional to the amount of heat sensed and recording, as cofunctions of time, the amplitudes of said first and said second signals.

2. A method in accordance with claim 1 wherein the angle at which said light beam is directed to and reflected from said film is 60 degrees from a line normal to said film.

3. A method according to claim 1 wherein said first signal proportional to the intensity of light sensed and said second signal proportional to the amount of heat sensed are developed and recorded as cofunctions of time continuously during transformation of said material from a liquid state to a solid state.

4. A method according to claim 2 wherein said first signal proportional to the intensity of light sensed and said second signal proportional to the amount of heat sensed are developed and recorded as cofunctions of time continuously during transformation of said material from a liquid state to a solid state.

5. A method for determining gelation and fusing properties of a dispersion coating material during transformation of said material from a liquid state to a solid state comprising applying a film of said material in liquid state to a substantially flat surface, directing a light beam to said film of said material at an angle from a line normal to said film, said angle being less than 90° but more than 15°, arranging and disposing a photonic signal generator means in the path of said light beam at a point specularly opposite the source of said light beam to sense light reflected from said film and to develop a first signal proportional to the intensity of light sensed, concurrently heating said film at a controlled heating rate, sensing the amount of applied heat and developing a second signal proportional to the amount of heat sensed and recording said first and said second signals as cofunctions of time.

6. A method according to claim 5 wherein the angle at which said light beam is directed to and reflected from said film is 60° from a line normal to said film.

7. A method according to claim 5 wherein said first signal proportional to the intensity of light sensed and said second signal proportional to the amount of heat sensed are developed and recorded as cofunctions of time continuously during transformation of said material from a liquid state to a solid state.

8. A method according to claim 6 wherein said first signal proportional to the intensity of light sensed and said second signal proportional to the amount of heat sensed are developed and recorded as cofunctions of time continuously during transformation of said material from a liquid state to a solid state.

References Cited in the file of this patent

UNITED STATES PATENTS

| | | |
|---|---|---|
| 2,049,947 | Cape | Aug. 4, 1936 |
| 2,110,748 | Tweedale | Mar. 8, 1938 |
| 2,624,195 | Van Alen | Jan. 6, 1953 |
| 2,697,933 | Donath | Dec. 28, 1954 |

FOREIGN PATENTS

| | | |
|---|---|---|
| 507,057 | Belgium | Mar. 27, 1953 |